Sept. 7, 1954     E. J. PELLETIER     2,688,511
HAND FORK
Filed Nov. 4, 1950
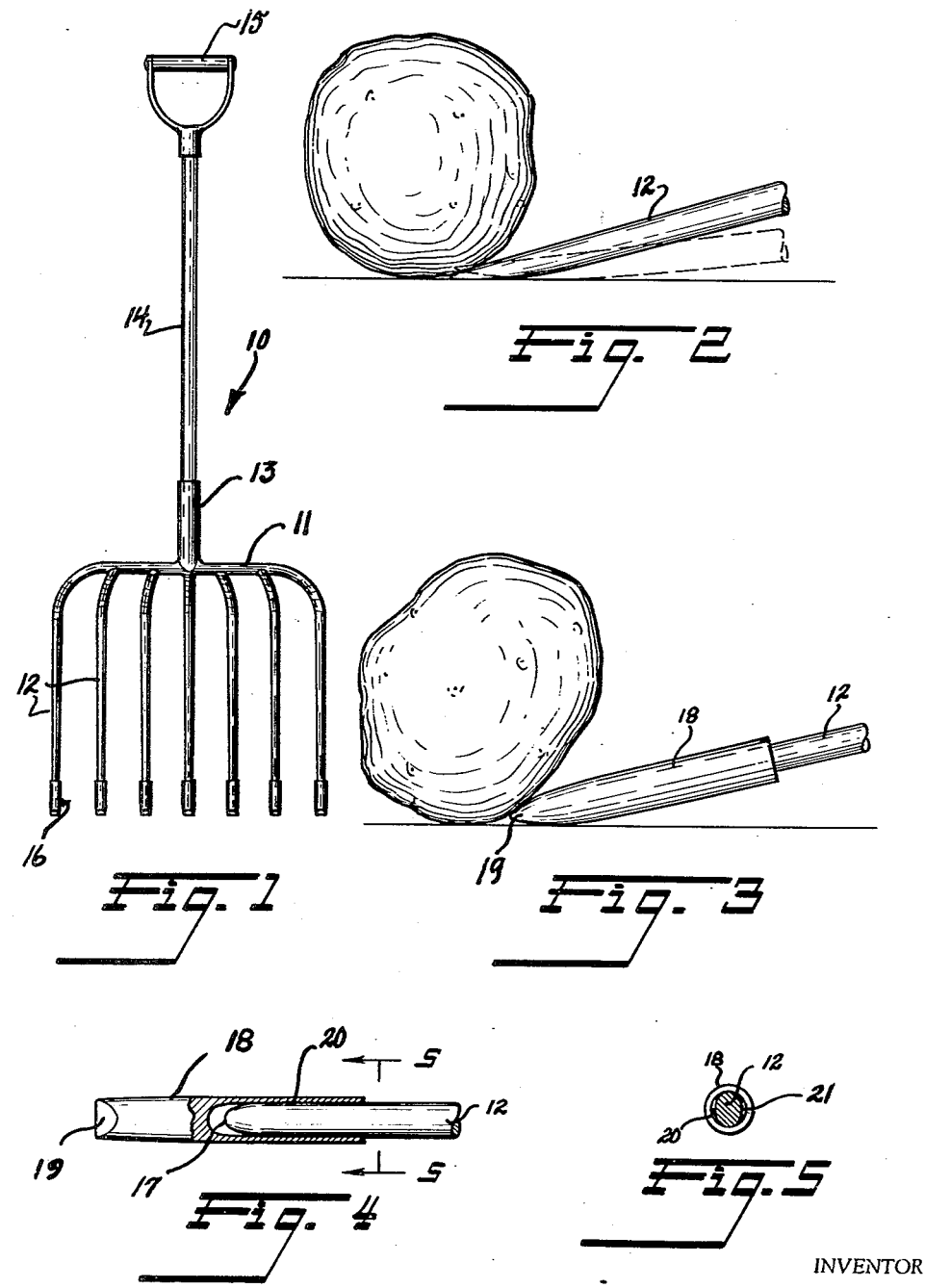
INVENTOR
ELOI J. PELLETIER Patented Sept. 7, 1954

2,688,511

UNITED STATES PATENT OFFICE 2,688,511

HAND FORK

Eloi J. Pelletier, Fort Kent, Maine

Application November 4, 1950, Serial No. 194,145

2 Claims. (Cl. 294—59)

The present invention relates to a hand fork and more particularly has reference to a fork assembly for handling potatoes and the like.

It is more or less conventional practice in the potato industry to store potatoes in bins until it is time to ship them to their ultimate destination. The potatoes are transferred from the bin to the shipping containers by the use of multi-tined forks and inasmuch as most storage bins have concrete floors, the constant frictional engagement of the tines with the floor tends to form a beveled cutting surface on the free ends of the tines within a relatively short time. This means that the use of such a fork will adversely affect the potatoes, since the sharpened tines have a tendency to bite into or bruise the potatoes frequently during the moving process. Since the shipping regulations of the major potato growing States set a maximum of bruised potatoes which can be shipped in a given container, it can be seen that the potato growers are confronted with a serious problem with respect to the manner and means by which potatoes are deposited into the shipping containers.

Past experiences have demonstrated that a satisfactory means of loading potatoes into the containers from the bins is by the use of hand forks. While these forks subject the potatoes to less injury than mechanical loaders, they do become sharpened at their free ends within about ten days under normal operating conditions, and the disadvantages of such tines have been set forth above. Other than the tines per se, the fork is entirely satisfactory, but most potato growers and shippers find it more economical to purchase new forks rather than take the risk involved in having the potato shipment condemned by the continued use of the old forks which, as stated previously, will bruise the potatoes.

Accordingly, a cardinal object of the invention is to overcome the above and other objectionable features by the provision of an attachment for conventional handforks which may be attached to the tines when they become worn to prevent further damaging of the potatoes and presenting a blunt end for the tines similar to the tines of a new fork.

Broadly, the inventive concept comprises the idea of securing a metallic sheath or sleeve to the end of each of the tines when they become worn and sharpened, by means of a suitable adhesive compound, the compound being such that upon the application of heat to the fork, the sheath may be removed therefrom for replacement purposes. More specifically, the sheath includes a body portion of a wear-resistant material having a socket therein for the reception of the tine, the socket being of such configuration as to provide a space between the tine and the socket-wall for receiving a liquid cement or adhesive for securing the body portion of the socket to the tine.

The above and other objects will become more readily apparent to one skilled in the art from a study of the ensuing description and drawings.

Reference is had to the following drawings wherein like reference characters indicate similar parts and in which:

Figure 1 is a front elevational view of a hand fork equipped with my novel attachments.

Figure 2 is a detailed view of one of the fork tines after continued use has sharpened the free end, the dotted lines depicting the manner in which the tines "dig" into the potato.

Figure 3 is also a detailed view illustrating the manner in which the protective sheath on the tine engages the potato.

Figure 4 is a fragmental side view, partly in section, showing the connection between the protective sheath and the tine and, Figure 5 is a sectional view taken along the line 5—5 of Figure 4, the view looking in the direction of the arrows.

Referring to Figure 1, a hand fork designated generally by numeral 10 comprises a fork body 11 having a plurality of tines 12, a socket 13 in which a handle 14 is secured, and a hand grip 15 is carried by the upper end of the handle 14. The salient feature of the invention is the protective sheath, denoted by the numeral 16, one of which is adapted to be attached to the lower end of each of the tines when the tines become worn to a sharpened or beveled surface as shown in Figure 2.

The lower end of a new tine is generally of oval configuration adjacent the lower end (Figure 5) and terminates in a blunt end as shown at 17. However, as hereinbefore pointed out, the continued use of the fork ultimately bevels the lower end of each tine and when this condition occurs, the sheath 16 is secured to each of the tines. The sheath 16 comprises a body portion 18 of any suitable wear-resistant material, preferably a hard-wearing metal alloy although it is obvious that the sheath could also be formed of a wear-resistant phenolic composition. Obviously, the sheath can be molded in a simple operation. The sheath is formed with a blunt end 19 substantially of the same configuration of a new tine. The body portion 17 is formed with a bore or socket 20 and, as perhaps best shown in Figure 5, the bore is circular in cross section. This means that when the ovoidal lower end of the tine is inserted into the bore, a space or hiatus 21 is provided between the sides of the tine and the bore. This space will permit the introduction of a suitable cement within the bore to secure the sheath fastly to the tine.

Consequently, it can be seen that the sheath 16 may be quickly and easily attached to each of the tines without the necessity of employing a skilled workman, which, of course, is of importance from the economic standpoint. Furthermore, the cement or adhesive is such that upon application of heat to the sheath the cement loses its holding qualities, thereby enabling the sheath to be readily detached from the tine. By virtue of this arrangement it is possible when one or more of the sheathes become worn to a sharpened edge, the defective sheath or sheathes may be readily removed and a new sheath attached to the tine.

It will be appreciated, therefore, that by the use of the present invention it is possible to use a single hand fork indefinitely by merely securing the attachment to each of the tines after they have been sharpened during usage. When the first or original sheath is no longer usable it is easily replaced by a new one and consequently the potato grower and shipper materially lessens the number of hand forks which must be purchased and thus reduces his cost of operation.

I claim:

1. An attachment for the pointed tines of hand forks comprising an auxiliary tine point encircling cylindrical sheath having a tip tapering equally from two opposite directions toward a median line to form an arcuate edged blunt point, said sheath having a bore therein, open at the end opposite said point, of a cross sectional configuration differing in configuration from and exceeding in area the cross sectional configuration of the tine, whereby to provide a space between the wall of said bore and said tine point and a heat dissoluble liquid adhesive introduced into said space.

2. An attachment for the pointed tines of hand forks having tines of ovoidal cross section comprising an auxiliary tine point encircling cylindrical sheath having a tip tapering equally from two opposite directions toward a median line to form an arcuate edged blunt point, said sheath having a bore therein open at the end opposite said point of a circular cross sectional configuration slightly exceeding in diameter the length of the longer axis of the cross section of a tine whereby to provide a space between the wall of said bore and said tine point and a heat dissoluble liquid adhesive introduced into said space.

References Cited in the file of this patent

UNITED STATES PATENTS

| Number | Name | Date |
|---|---|---|
| 22,235 | Hadcock et al. | Dec. 7, 1858 |
| 316,347 | Ervien | Apr. 21, 1885 |

FOREIGN PATENTS

| Number | Country | Date |
|---|---|---|
| 578,672 | France | Oct. 2, 1924 |
| 282,586 | Germany | Mar. 10, 1915 |
| 473,090 | Germany | June 25, 1927 |
| 652,618 | Germany | Oct. 21, 1937 |